US011032979B2

(12) United States Patent
Shelton

(10) Patent No.: US 11,032,979 B2
(45) Date of Patent: Jun. 15, 2021

(54) APPARATUSES AND METHODS FOR FORMING CONCRETE CURBING

(71) Applicant: James Craig Shelton, Tarpon Springs, FL (US)

(72) Inventor: James Craig Shelton, Tarpon Springs, FL (US)

( * ) Notice: Subject to any disclaimer, the term of this patent is extended or adjusted under 35 U.S.C. 154(b) by 849 days.

(21) Appl. No.: 15/604,633

(22) Filed: May 24, 2017

(65) Prior Publication Data

US 2017/0339836 A1    Nov. 30, 2017

Related U.S. Application Data

(60) Provisional application No. 62/340,721, filed on May 24, 2016.

(51) Int. Cl.
*A01G 9/28* (2018.01)

(52) U.S. Cl.
CPC ..................... *A01G 9/28* (2018.02)

(58) Field of Classification Search
CPC ........ E01C 19/00; E01C 19/50; E01C 19/506; E01C 19/508; E04F 21/16; E04F 21/161
See application file for complete search history.

(56) References Cited

U.S. PATENT DOCUMENTS

| | | | |
|---|---|---|---|
| 4,566,823 A * | 1/1986 | May | E01C 19/4893 404/98 |
| 6,123,443 A * | 9/2000 | Conway | F21S 8/032 362/145 |
| 2012/0155960 A1* | 6/2012 | Lowery | E01C 19/502 404/72 |

* cited by examiner

*Primary Examiner* — Stella K Yi
(74) *Attorney, Agent, or Firm* — Mark C. Johnson; Johnson Dalal

(57) ABSTRACT

A specialized curb forming tool and a method of using the tool to simply and easily create custom concrete curbing of any shape and length without complicated equipment or specialized expertise.

5 Claims, 5 Drawing Sheets

APPARATUSES AND METHODS FOR FORMING CONCRETE CURBING

CROSS-REFERENCE TO RELATED APPLICATIONS

This application claims the benefit of U.S. Provisional Patent Application No. 62/340,721, filed May 24, 2016, the entire disclosure of which is incorporated herein by reference.

COPYRIGHT NOTICE

A portion of the disclosure of this patent document contains material which is subject to copyright protection. The copyright owner has no objection to the facsimile re-production by anyone of the patent document or the patent disclosure, as it appears in the Patent and Trademark Office patent file or records, but otherwise reserves all copyright rights whatsoever. 37 CFR 1.71(d).

FIELD

At least some embodiments disclosed herein relate, in general, to apparatuses and methods for forming concrete curbing and more specifically to the use of a specialized tool for the formation of concrete curbing of varying shapes and forms.

BACKGROUND

Homeowners and owners of commercial buildings commonly wish to provide beautiful landscaping for their homes and buildings. Such landscaping may include beds for various plants and other decorative items such as, for example statues or birdbaths. Such beds often have some sort of edging. Typical do-it-yourself edging that homeowners often install is made from bricks, stones, wooden pegs, or some sort of short fencing. Such that have some sort of edging around the beds. Such edging, however, is square, choppy, or flimsy, and may not be particularly attractive.

Alternatively, the homeowner could hire a contractor to install professional curbing. Unfortunately, such professional curbing can be expensive, costing over $16 a linear foot. The complicated equipment used to create professional curbing may well be beyond the skill of a typical homeowner to use, leaving the homeowner no choice but to hire a contractor or install substandard edging.

SUMMARY

In an embodiment, the present disclosure relates to a specialized curb forming tool and a method of using the tool to simply and easily create custom concrete curbing of any shape and length without complicated equipment or specialized expertise.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
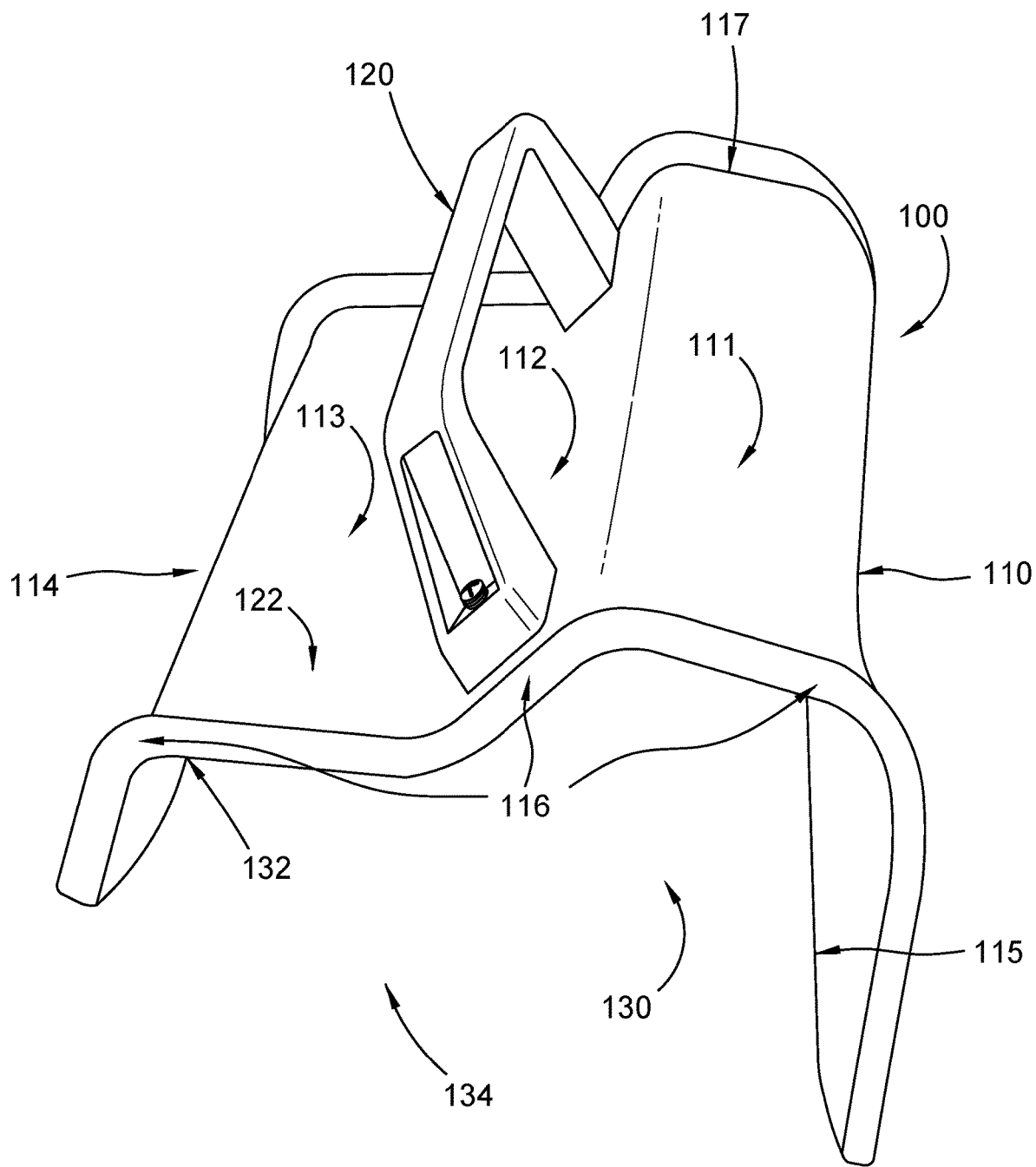
FIG. 1 illustrates a perspective view of an embodiment of a curb forming tool in accordance with the present disclosure.
Figure 2:
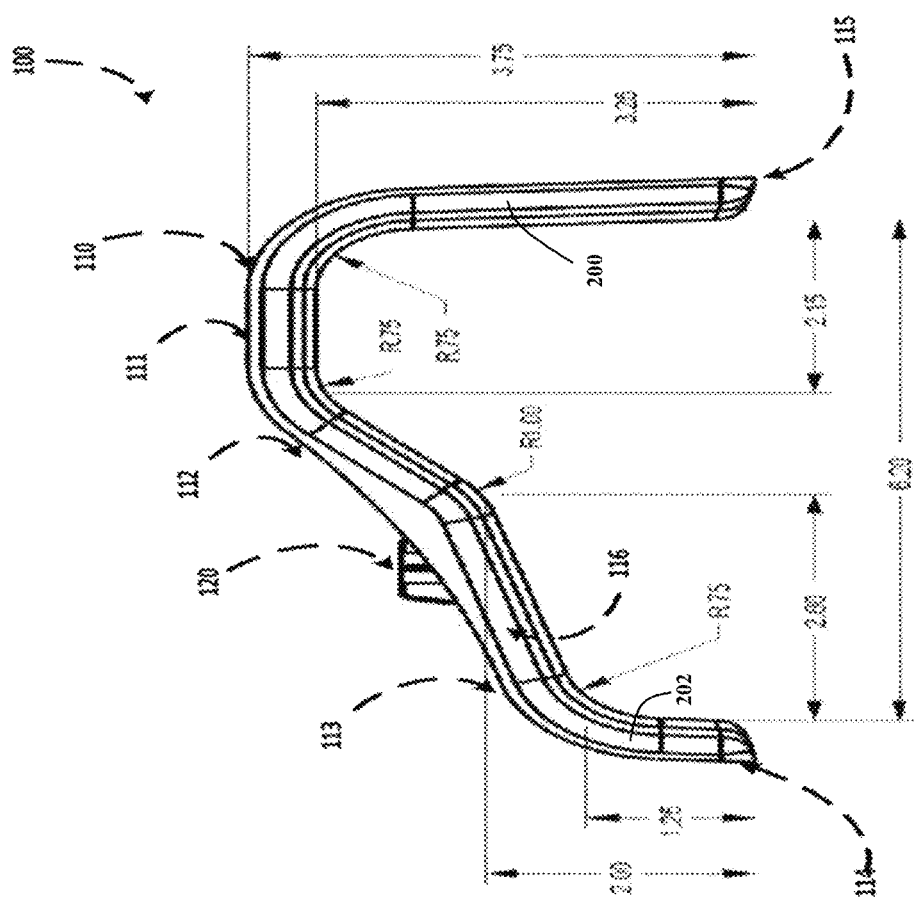
FIG. 2 illustrates a side view of the curb forming tool in FIG. 1 including dimensions of the tool.

FIG. 1 illustrates a perspective view of an embodiment of a curb forming tool in accordance with the present disclosure. FIG. 2 illustrates a side view of the curb forming tool in FIG. 1 including dimensions of the tool (excluding the width of the tool seen from the top of the tool, which in an embodiment is approximately 6.75")

With respect to both FIG. 1 and FIG. 2, the curb forming tool 100 comprises a sheet 110 of rigid material. In the illustrated embodiment, the sheet 110 is a single portion of material. In other embodiments, the sheet 110 could be composed of two or more portions of rigid materials joined together. In such embodiments, each portion could be a different rigid material or the same material. In the illustrated embodiment, the thickness of the sheet 110 it is about ¼ inch. However it should be noted that the thickness of the sheet could vary based on the material used.

Various materials can be used, so long as they are relatively rigid. In the illustrated embodiment, the material used as a plastic. The plastic has the advantage of being cheap and easy to manufacture, and also provides a lightweight device that does not have sharp edges. Other materials that could be used include metal, wood, fiberglass, and silicone.

In the illustrated embodiment, the sheet 110 has a first side 116. The first side 116 is curved upward adjacent to the edge of the first side. The sheet 110 also has a second side 117 which is similarly curved upward adjacent to its edge. Curbing the edge of the two sides 116 and 117 aid in providing a smooth surface to a curb that is formed using the curb forming tool. The sheet 110 additionally has a first end 115 and a second end 114 opposing the first end 115 of the sheet 110.

The sheet 110 is formed into a curved configuration having a top 111, 112, and 113 and a bottom comprising a space or volume 130 defined by bottom surface 132 of the sheet 110 between the first end 115 and the second end 114 of the sheet 110. The curved configuration encloses a volume 130 that is in open communication with the first side 116 of the sheet 110, the second side 114 of the sheet 110, and the bottom surface 132 of the curved configuration of the sheet. With reference to FIG. 1 and FIG. 2, the sheet 110 can also be seen having a top surface 122, a bottom surface 132 opposing the top surface 122, and the two sides 116, 117 curving upwardly adjacent to the edge of the first side 116 with said edges terminating above the top surface 122 of the sheet 110. The second side 117 opposes the first side 116 of the sheet 110. A sheet width (as described above) separates the first side 116 of the sheet 110 and the second side 117 of the sheet 110. The sheet 110 can also be seen having a rear wall 200 defining the first end 115 of sheet and spanning the sheet width. The sheet 110 can also be seen having a front wall 202 defining the second end 114 of sheet 110 and spanning the sheet width. The sheet has top wall portions 111, 112, 113 being formed into a curved configuration. The sheet 110 also defines a space 134 between the first end and the second end of the sheet 110. The front wall 202, the rear wall 200, and the top wall portions 111, 112, 113 can be seen defining a volume 132 in open communication with the first side 116 of the sheet and the second side 117 of the sheet. The first and second sides 116, 117 of the sheet 110 can be seen having the curved orientation along the sides 116, 117 extending continuously and separating the first and second ends 114, 115 of the sheet 110 to easily create custom concrete curbing of any shape and length without complicated equipment or specialized expertise (as described above).

In the illustrated embodiment, the top of the curved configuration of the sheet 110 is segmented into three distinct flat surfaces, a first flat surface 111, a second flat surface 112, and a third flat surface 113. The first flat surface 111 is connected to the second flat surface 112 at a first angle, and the second flat surface 112 is connected to the third flat surface 113 at a second angle.0

Configuring the top of the curved configuration in three flat surfaces gives curbs formed by the curb forming tool 100 a distinct appearance. Other embodiments are possible, for example, a single flat surface which leads to a rectangular curb. Alternatively there could be two, three, four, five, or more flat surfaces at various angles to one another. Note that the dimensions of the tool given above and in FIG. 2 represent only one possible embodiment, and the dimensions of the tool could be larger or smaller without altering the functions of the tool or its use.

In the illustrated embodiment, the curb forming tool 100 additionally comprises a handle 120 attached to the second flat surface 112 of the sheet 110. The handle 120 enables the tool to be used more easily, as should be apparent when the use of the tool is described below.

The handle 120 could be attach to various positions on the top of the curved configuration of the sheet 110, for example the flat surface 111 or the flat surface 113. The handle 120 can be any shape suitable for the effective use of the tool. The handle 120 can be separately attached to the sheet 110, or could be an integral part of the sheet 110, and could be composed of any suitable material. In the illustrated embodiment, the handle is composed of an inexpensive lightweight plastic different than that composing the sheet 110.

Figure 3:
FIG. 3 illustrates preparing ground in a yard of a house for laying a curb in accordance with an embodiment of the present disclosure.
Figure 4:
FIG. 4 illustrates packing cement into the curb forming tool as part of the method of forming a curb in accordance with an embodiment of the present disclosure.
Figure 5:
FIG. 5 illustrates moving the curb forming tool off of packed cement in preparation for forming a next segment of the curb of FIG. 4 as part of the method of forming a curb in accordance with an embodiment of the present disclosure.

FIG. 3 through FIG. 5 illustrate an exemplary use of and embodiment of the curb forming tool of the present disclosure to cast a curb for a portion of land in a typical homeowner's yard.

FIG. 3 illustrates preparing ground in a yard of a house for laying a curb in accordance with an embodiment of the present disclosure.

In the illustration, a homeowner is clearing a strip 210 on a portion of land 200 using a shovel. The strip 210 is cleared of loose dirt, vegetation, and any other loose materials. The homeowner need not dig into the ground, as the curb will set right on the surface of the strip 210. The strip 210 could, of course, be cleared using any conventional means suitable to the task. In clearing the strip 210, the strip is given a visible edge 220. The strip 210 could be as long or short as the homeowner desires. Furthermore, the strip 210 could be linear, or could be curvilinear, or any other shape the homeowner desires. In FIG. 3, the strip 210 is curvilinear.

FIG. 4 illustrates packing cement into the curb forming tool as part of the method of forming a curb in accordance with an embodiment of the present disclosure.

In the illustrated embodiment, the process of casting a curb on the strip 210 is begun at one end of the strip 210. The curb is cast in a plurality of curb segments. FIG. 4 shows the casting of the first curb segment of the curb.

The process of casting this segment is as follows. The curb forming tool 100 is placed on the strip 210 such that the first and of the curb forming tool 100 is adjacent to the visible edge of the strip 220 and the bottom of the curb forming tool sits on the strip. (i.e. flat on the ground.)

The volume of the curb forming tool 100 is then packed with a cement mixture at the first side of the curb forming tool. In the illustrated embodiment, this requires about two handfuls of cement mixture. This forms a curb segment.

In an embodiment, the cement mixture is a mixture of sand and Portland Cement. In an embodiment, the ratio of sand to Portland Cement is 4 to 1. and sand. Finer sand will produce a smoother finish than coarse sand. Premix concrete is less desirable, as it typically contains rocks and will not form a smooth curb. Additionally it requires too much water and will not hold freestanding as is necessary to create good curbs Regardless of what materials are used in the cement mixture, the cement mixture should have a consistency that ensures the mixture once formed using the curb forming tool will hold its shape until it dries. Thus, a particularly wet cement mixture, and typical premix concrete mixtures, are not suitable.

FIG. 5 illustrates moving the curb forming tool off of packed cement in preparation for forming a next segment of the curb of FIG. 4 as part of the method of forming a curb in accordance with an embodiment of the present disclosure.

After a curb segment has been cast, such as shown in FIG. 4, the curb forming tool 100 is slid down the curb 300 off of the curb segment that has just been cast, in the illustrated embodiment, in the direction of the first side of the curb forming tool. In the illustrated embodiment, the first end of the curb forming tool 100 remains adjacent to the visible edge 220 of the strip 210. In FIG. 5 several segments of the curb 300 have already been cast. The process illustrated in FIG. 5 is repeated until the plurality of curb segments required to cast the curb have all been cast.

Figure 6:
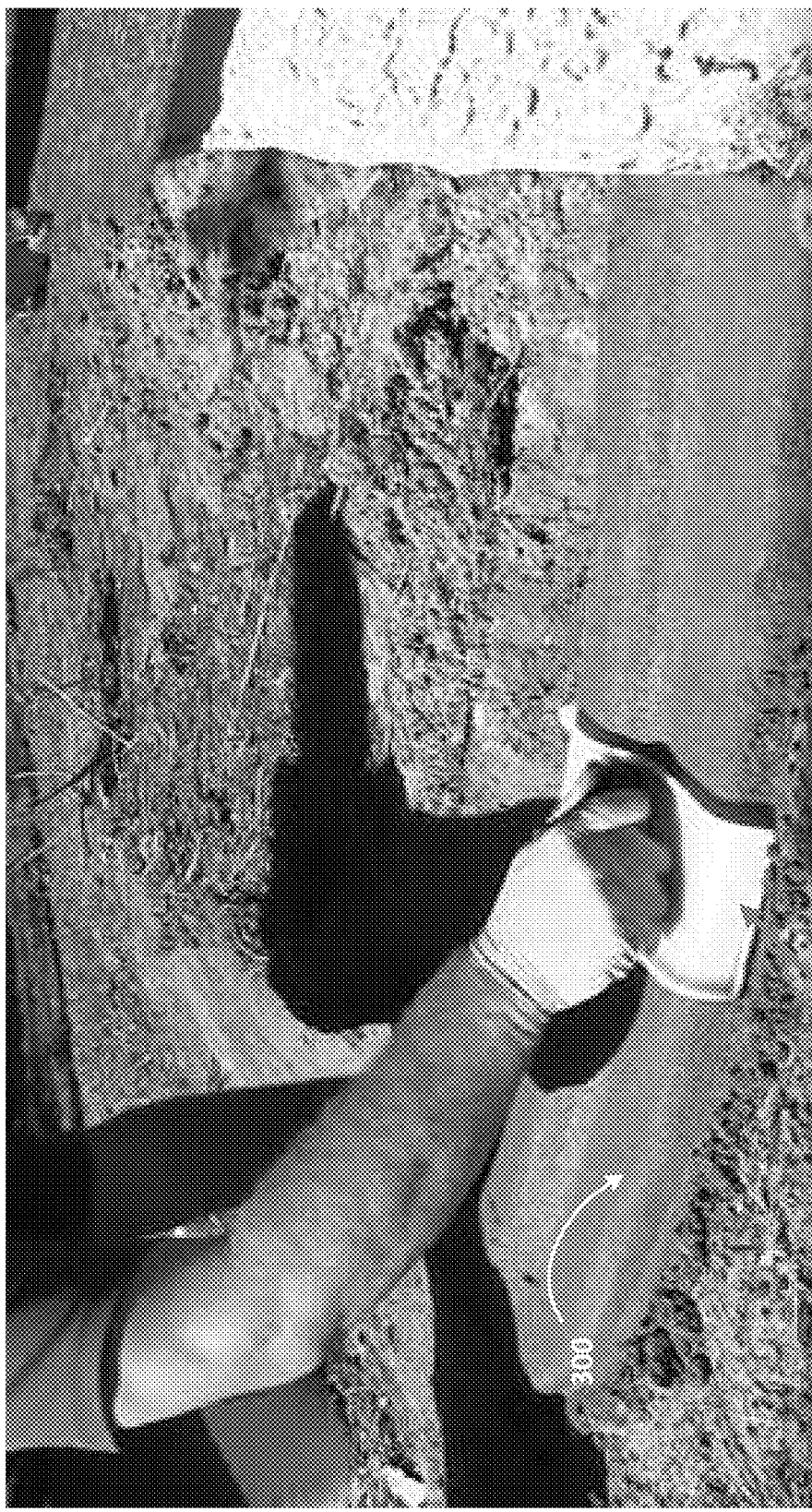
FIG. 6 illustrates using the curb forming tool to smooth the curb of FIG. 4 and FIG. 5 as part of the method of forming a curb in accordance with an embodiment of the present disclosure.

FIG. 6 illustrates using the curb forming tool to smooth the curb of FIG. 4 and FIG. 5 as part of the method of forming a curb in accordance with an embodiment of the present disclosure.

In an embodiment, after a number of curb segments have been cast, the appearance of the curb 300 can be refined by smoothing the curb. In the illustrated embodiment FIG. 6, the curb forming tool 100 has been rinsed with water and the curb forming tool is then slid down at least a portion of the curb 300, thereby smoothing that portion of the curb.

In various other embodiments, the appearance of a curb cast using the curb forming tool can be further refined by buffing the cast curb with a wet sponge before the curb has fully dried. Minor defects in the curb, such as holes or pits, can be repaired with a wet cement mixture.

In various embodiments, finished curbs can be sustained, painted, etched. Colors designs and textures can be added to wet concrete. Using the curb forming tool illustrated in FIG. 1 and FIG. 2, the finished curb is approximately 7 inches wide and about 4 inches high and made of solid concrete. Grass and weeds do not grow under it or through it. The curb sits directly on the ground, the same as with professional curbing contractors. Installation is the same in all geographic locations regardless of seasonal climate change.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

The invention claimed is:

1. A curb forming tool comprising:
a sheet composed of a single portion of a rigid material, the sheet having a top surface, a bottom surface opposing the top surface, a first side having an edge, the first side being curved upward adjacent to the edge of the first side that terminates above the top surface of the sheet, a second side, opposing the first side of the sheet and having an edge, the second side being curved upward adjacent to the edge of the second side that terminates above the top surface of the sheet, a sheet width separating the first side of the sheet and the second side of the sheet, a rear wall defining a first end of sheet and spanning the sheet width, and a front wall defining a second end of sheet and spanning the sheet width, the sheet having top wall portions being formed into a curved configuration and defining a space between the first end and the second end of the sheet, the front wall, the rear wall, and the top wall portions define a volume in open communication with the first side of the sheet and the second side of the sheet and the first and second sides having the curved orientation extending continuously along the first and second sides that separate the first and second ends of the sheet; and
a handle attached to the top surface of one of the top wall portions of the sheet.

2. The curb forming tool of claim 1, wherein the top wall portions of the sheet comprises a first flat surface, a second flat surface, and third flat surface, wherein the first flat surface is connected to the second flat surface at a first angle, and the second flat surface is connected to the third flat surface at a second angle.

3. The curb forming tool of claim 2, additionally comprising the handle attached to the second flat surface of the top surface of the sheet.

4. The curb forming tool of claim 1, wherein the rigid material is one of the group consisting of: plastic, wood, metal, fiberglass, and silicone.

5. A curb forming tool comprising:
a sheet composed of a single portion of a rigid material, the sheet having a top surface, a bottom surface opposing the top surface, a first side having an edge, the first side being curved upward adjacent to the edge of the first side that terminates above the top surface of the sheet, a second side, opposing the first side of the sheet and having an edge, the second side being curved upward adjacent to the edge of the second side that terminates above the top surface of the sheet, a sheet width separating the first side of the sheet and the second side of the sheet, a rear wall defining a first end of sheet and spanning the sheet width, and a front wall defining a second end of sheet and spanning the sheet width, the sheet having top wall portions being formed into a curved configuration, having a first flat surface, a second flat surface, and third flat surface, and defining a space between the first end and the second end of the sheet, the front wall, the rear wall, and the top wall portions define a volume in open communication with the first side of the sheet and the second side of the sheet and the first and second sides having the curved orientation extending continuously along the first and second sides that separate the first and second ends of the sheet, wherein the first flat surface is connected to the second flat surface at a first angle, and the second flat surface is connected to the third flat surface at a second angle;
and a handle attached to the second flat surface of the top surface of the sheet.

* * * * *